US005138837A

United States Patent [19]

Obertrifter et al.

[11] Patent Number: 5,138,837

[45] Date of Patent: Aug. 18, 1992

[54] LOAD INDEPENDENT VALVE CONTROL FOR A PLURALITY OF HYDRAULIC USERS

[75] Inventors: Bernd Obertrifter, Rechtenbach; Armin Stellwagen, Lohr, both of Fed. Rep. of Germany

[73] Assignee: Mannesmann Rexroth GmbH, Lohr, Fed. Rep. of Germany

[21] Appl. No.: 659,971

[22] Filed: Feb. 26, 1991

[30] Foreign Application Priority Data

Feb. 26, 1990 [DE] Fed. Rep. of Germany ....... 4005967

[51] Int. Cl.[5] .............................................. F16D 31/02

[52] U.S. Cl. ....................................... 60/426; 60/450; 60/452

[58] Field of Search .................. 60/426, 427, 450, 492

[56] References Cited

U.S. PATENT DOCUMENTS

| | | | |
|---|---|---|---|
| 4,087,968 | 5/1978 | Bianchetta | 60/484 |
| 4,436,114 | 3/1984 | Kotter | 60/427 |
| 4,693,272 | 9/1987 | Wilke | 60/427 |
| 4,986,071 | 1/1991 | Voss et al. | 60/427 |
| 5,025,625 | 6/1991 | Morikawa | 60/426 |

FOREIGN PATENT DOCUMENTS

| | | |
|---|---|---|
| 0203100 | 6/1986 | European Pat. Off. . |
| 0366815 | 11/1989 | European Pat. Off. . |
| 3605312 | 8/1986 | Fed. Rep. of Germany . |
| 3532816 | 3/1987 | Fed. Rep. of Germany . |
| 3634728 | 4/1988 | Fed. Rep. of Germany . |
| 8911041 | 11/1989 | PCT Int'l Appl. . |

*Primary Examiner*—Edward K. Look
*Assistant Examiner*—F. Daniel Lopez
*Attorney, Agent, or Firm*—Cushman, Darby & Cushman

[57] ABSTRACT

For a load independent control of a plurality of simultaneously actuable hydraulic users, a throttle valve (pressure compensator) is assigned to the control valve of each user at a location downstream with respect to the metering orifice formed by said control valves; said throttle valve is subjected in opening direction to the pump pressure and in closing direction, via a shuttle valve, either to a load pressure of the respective user or to a pressure which is determined by the highest load pressure occurring for one of said users. Said highest load pressure which is reported by a shuttle valve chain is supplied as control pressure to a pressure reducing valve, the input side thereof being connected with the pressure line of the pump and the output side thereof being connected to control lines leading to the throttle valves assigned to the individual control valves and to the control line for the pump control. The control of the pump control as well as of the pressure compensators by means of the highest indirect load pressure LS to the pressure reducing valve has the advantage that for starting and changing of direction, respectively, the danger of a sinking of the user is avoided.

10 Claims, 3 Drawing Sheets

LOAD INDEPENDENT VALVE CONTROL FOR A PLURALITY OF HYDRAULIC USERS

TECHNICAL FIELD

This invention relates generally to a load independent valve control for a plurality of hydraulic users which can be simultaneously controlled.

The invention relates more specifically to a load independent valve control for a plurality of hydraulic users which can be simultaneously controlled; wherein the following is assigned to each user: a control valve and a throttle valve; the latter is located—in flow direction upwardly13 between the control valve and the user; the throttle valve (pressure compensator), is subjected in opening direction to the pump pressure (P) and in closing direction to the pressure defined by the highest load pressure (LS) of the users. The hydraulik or pressure medium used is preferably a hydraulik oil.

BACKGROUND ART

A valve control known from DE-OS 36 34 728 provides that the flows of volume (volume flows), which are determined by the opening cross section of the control valves, are maintained constant with the same ratio even through individual simultaneously operating users have different loads: This is achieved by arranging downstream of a metering orifice of each control valve a pressure compensator ((throttle valve). The control spool of said pressure compensator is subjected to the pump pressure in the direction of the opening, and to the highest load pressure occurring in one of the users in the direction of closing. Thus, the pressure pressure compensator will control the volume flow of the pressure medium such that the pressure differential occurring at the control valve will remain constant even if different load pressures exist. Consequently, also the appropriate flow of the pressure medium (working liquid) and the operating speed, respectively, of the user remains constant. In said known hydraulic system, a plurality of user is supplied by a single controllable or variable pump via a respective control valve and a respective pressure compensator. Further, in said system, the highest pressure occurring at one of said users is selected by means of a chain of shuttle valves and is guided to all pressure compensators to act in the closing direction. Thus, the control spools of the pressure compensators will adjust such that at the respective metering orifices in the control valve, always the same pressure differential exists, even for different loads of the users. This is basically a valve control for dividing the pump flow into individual partial flows flowing to each user, wherein even for different loads of the users, the ratio of the divisional flows remains constant and thus, the desired speed is maintained. This ratio of the divisional flows remains constant even if the source of pressure medium does not supply enough volume flow for supplying all users. In such a situation, all partial flows will be reduced, however, the ratio amongst the partial flows remains constant. Inasmuch as the control conduits are relieved towards the tank in the center position (zero position), the known valve controls show a short time pressure reduction in the user conduits when starting and if a change of direction occurs, respectively. This is so, because the amount of pressure medium (control oil) for the load sensing conduit has to be replenished from the user ports. Said pressure reduction has the consequence that the users under load will sink for a short time.

For another type of valve control (DE-OS 36 05 312) it is already known to avoid said sinking of the load. For this purpose, two additional auxiliary spools are provided in the main control spool with respective switching spools. This solution is very costly and can be used only up to a certain nominal valve size.

The present invention is directed to overcoming one or more of the problems of the prior art.

It is an object of the invention is to provide a valve control arrangement which will avoid the occurrence of a sinking of the load during a control operation independently of the size of the valves.

It is another object of the invention to provide a load independent valve control using relatively simple and less costly hardware.

DISCLOSURE OF THE INVENTION

In one aspect of the present invention a load independent valve control for a plurality of hydraulic users is provided. Said users can be simultaneously controlled. Each user has assigned to it a control valve and a throttle valve. The throttle valve is located—in flow direction upwardly—between the control valve and the user: The throttle valve (pressure compensator), is subjected in opening direction to the pump pressure (P) and in closing direction to the pressure defined by the highest load pressure (LS) of the users.

Preferred modifications of the invention may be gathered from the dependent claims.

In accordance with the invention, the amount of control oil necessary for the control of the pressure compensators and the control of the pump is taken from the pressure side of the pump by means of a pressure reducing valve which is controlled by the highest load pressure. On the side of the user, it is only required to supply a pressure information to the pressure reducing valve; said pressure information requiring, for all practical purposes, zero amount of control oil. Thus, a sinking of the load is effectively avoided when controlling the user. In case that the own load pressure is larger than the pump pressure when starting and changing the direction, respectively, of a user, said own load pressure closes via a shuttle valve the pressure compensator so that the load is maintained in its position.

An embodiment of the invention will be explained below, referring to the drawings.

Figure 1:
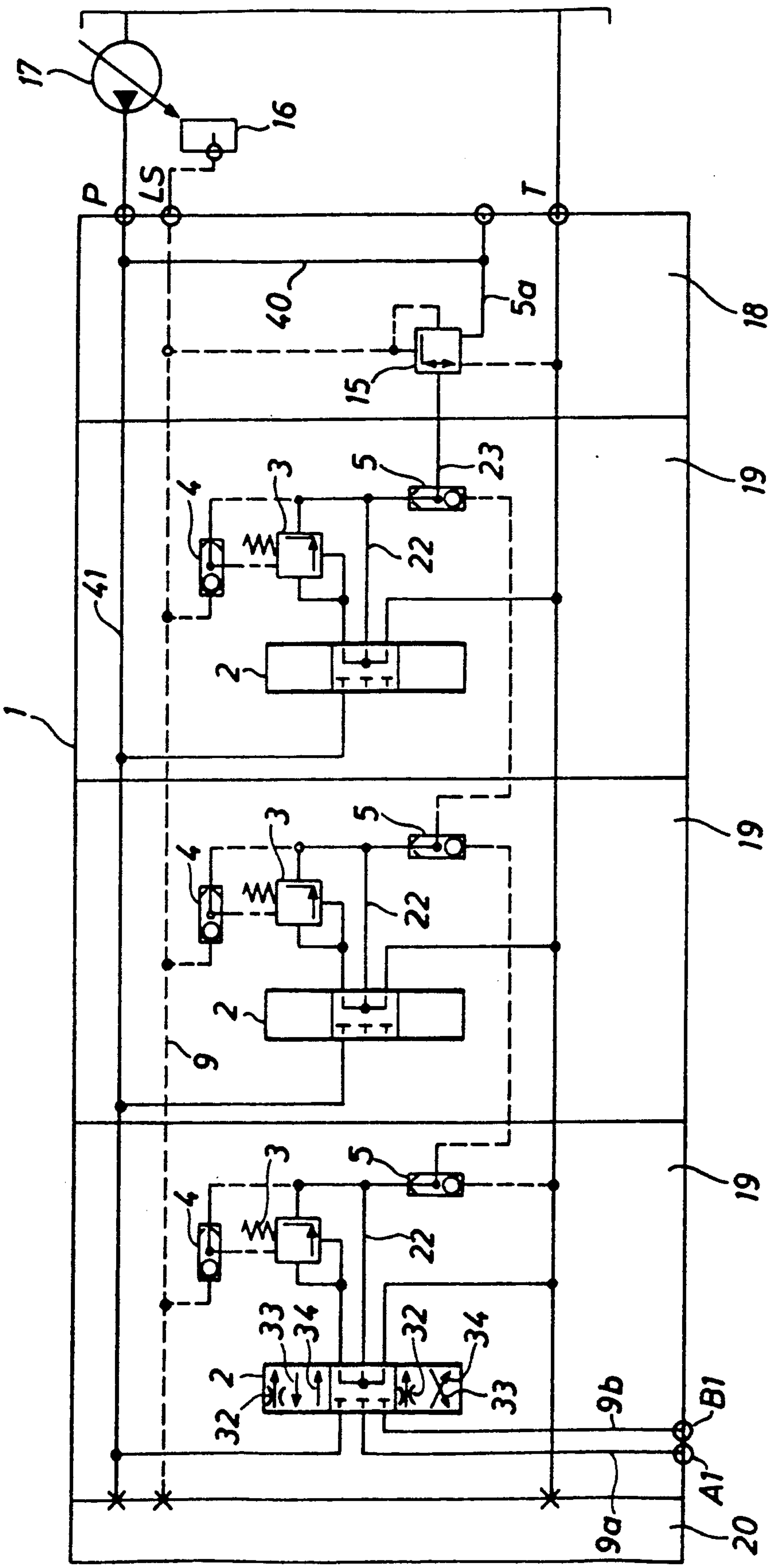
FIG. 1 is a circuit diagram of a control block for three users for a load independent flow distribution and with a load holding function.

In FIG. 1, a control block 1 having three users is shown, wherein for each user a valve arrangement 19 of symmetric design is provided; said valve arrangement comprises a control valve 2, a throttle valve (flow control valve with adjustable metering throttle) 3 and two shuttle valves 4,5. The user ports are referred to by A1, B1, the port of the variable pump 17 is referred to by P, the tank port is referred to by T and the port for the load information conduit for the throttle valve 3 and for the pump control 16 is referred to by LS.

In the input segment 18 of the control block 1, a pressure reducing valve 15 is provided which is supplied with control liquid by a pump 17. Each of the throttle valves 3 is formed as a pressure compensator and is located in downflow direction with respect to the metering orifice 32 of the control valve 2 and in flow direction upwardly with regard to directional control 33,34.

The load pressure which is present at each control valve 2 is supplied via a conduit 22 to the shuttle valves 5 so that at the output of the last shuttle valve 5, and thus in the control pressure conduit 23 leading to the pressure reducing valve 15, the respective highest load pressure is present, by means of which the pressure reducing valve 15 is controlled; the input 15*a* of said pressure reducing valve 15 is connected via the channel 40 with channel 41, which is connected with the pressure side of the pump 17. Thus, the control liquid supplied via the control channel 9 to the pressure compensators 3 as well as via the control conduit LS to the pump control 16 is taken from the working liquid of the pump, and the control pressure is applied by the pressure reducing valve corresponding to its control by the maximum load pressure. As long as the pump pressure P is larger than the load information pressure generated by the pressure reducing valve 15, the pressure compensators remain in their control position.

In the center position of the control valves, also the shuttle valves 5 are relieved towards tank so that also via the pressure reducing valve 15 the control channel 9 and the control conduit LS, respectively, are relieved towards tank, so that the pump control 16 also controls back towards zero. When starting a user, the amount of control oil for the load information conduit LS is taken from the pump via the pressure reducing valve 15 and not, as is otherwise customary, from the user port. In this manner, the danger of a sinking of the user when starting and changing the direction, respectively, is avoided.

Figure 2:
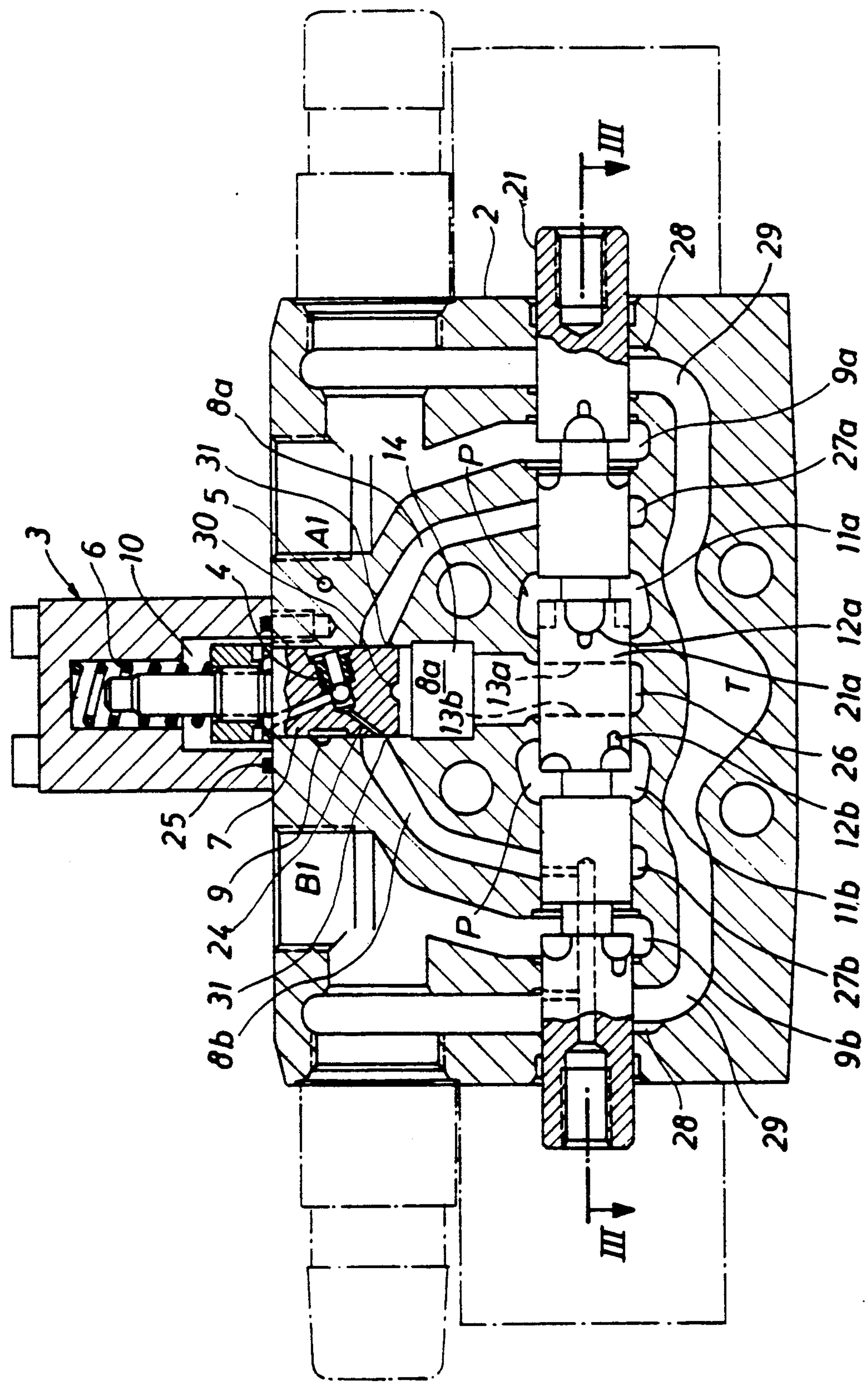
FIG. 2 shows the construction of a control valve in sandwich design having a built-in throttle and shuttle valve.
Figure 3:
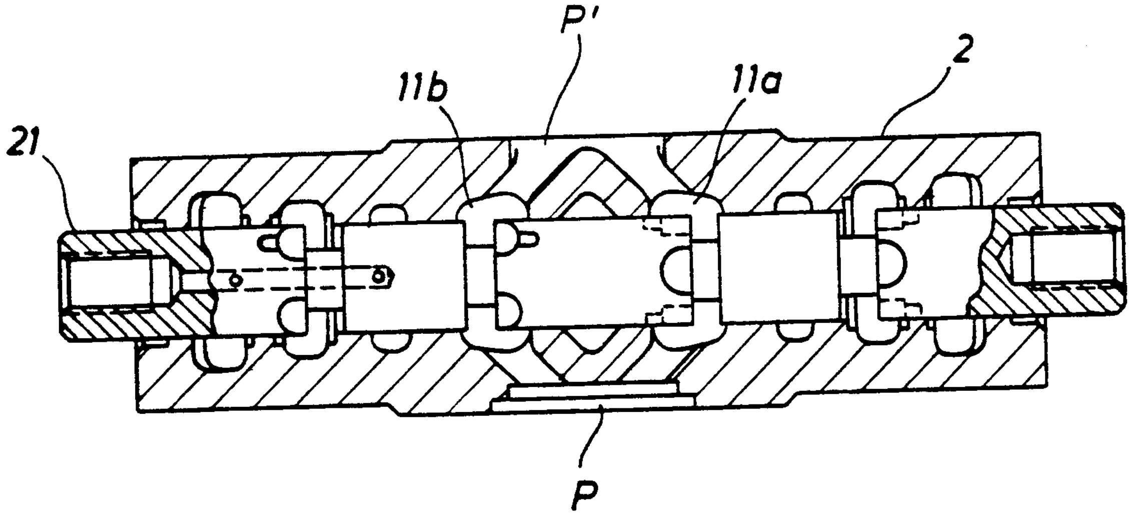
FIG. 3 is a cross-sectional view along line III—III of the housing body of FIG. 2.

As is shown in FIGS. 2 and 3, the symmetric control valve arrangement 19 is provided with centrally located pump ports P,P' which are connected on the input side and on the output side with two similar housing chambers 11*a*, 11*b*. The pump port P' on the output side of the valve housing 2 forms, as is shown in FIG. 3, the pump port P for the next valve arrangement 19. The two housing chambers 11*a*, 11*b* are arranged —with respect to the valve center 21*a*—at both sides f the housing chamber 26; said housing chamber 26 is connected with channel 14 comprising said pressure compensator 3. The channel 14 is connected via the control spool 7 of a pressure compensator 3 with the channels 8*a*, 8*b* which are arranged symmetrically with respect to the center of the valve. Said channels 8*a*,8*b* end in control chambers 27*a*, 27*b* which are arranged between control chambers 9*a*, 9*b* and the chambers 11*a*, 11*b* which are subject to the pump pressure; said control chambers 9*a*, 9*b* are connected with the user ports A1,B1. On both sides, control chambers 9*a*, 9*b* are assigned to housing chambers 28 which lead via channels 29 to the tank port T.

As can be seen in FIG. 2, the symmetric valve spool 21 comprises control edges 12*a*, 12*b* at the center spool land 21*a*; said control edges 12*a*, 12*b* cooperate with control edges 13*a*, 13*b* of the center chamber 26, depending on the direction of the user, so as to form a metering orifice. The metering orifice thus formed cooperates with the pressure compensator integrated in channel 14. The pressure compensator 3 is also provided with a control edge 30 at its control spool 7; said control edge 30 cooperates with the control edge 31 at the housing and connects channel 14 with the channels 8*a*, 8*b*. In the control spool 7 of the pressure compensator, a shuttle valve 4 is incorporated; said shuttle valve 4 delivers—via another bore 25 to the control chamber 10—either the highest load pressure in the system reported by a shuttle valve chain 5 via the pressure reducing valve 15 (FIG. 1), or the load pressure of the respective user, which is taken via a bore 24 from the channels 8*a*, 8*b*. Said load pressure forming the control pressure is applied together with the force of a positioning spring 6 onto the control spool 7 in the direction of closing. In case the own load pressure of a user becomes larger than the pressure generated by the pump in the system, then said own load pressure is passed via said shuttle valve 4 onto the control spool 7 of the pressure compensator 3 and closes the pressure compensator. Thus, the own load will be held in its position (load holding function). In case the pressure downstream of the metering orifice is larger than the highest load pressure present in the system, then the pressure compensator will be opened. The pressure differential at the metering orifice is maintained constant by each assigned pressure compensator, as a consequence of which the amount of selected flow at each user is held constant with the same ratio.

Below some further amplification of the above description will be provided.

Turning now to FIG. 1, a control block 1 is shown as comprising a number of valve arrangements or valve segments 19 together with an input segment 18 and an end segment 20. The control block 1 has a pump port P, a load sensing port LS, tank port T, and another port connected to a pressure reducing valve 15. The control block further has a number of output ports for the connection with users. Each of the valve segments 19 comprises user ports A1, B1 and A2, B2 and A3, B3, respectively. None of the hydraulic users is shown.

Connected with the pump port P is a variable pump 17. The tank is shown schematically to the right of said pump 17. Connected to the port LS is a pump control 16. Tank port T is connected to the tank shown schematically to the right of said port.

A channel 41 extends all the way through the segments 18 and 19 and is closed by the end segment 20. Likewise, a control channel 9 extends through all the segments 18, 19 and is again closed by the end segment 20. Similarly, a tank channel 241 extends through all the segments 18 and 19 and is closed by the end segment 20.

The following description will relate primarily to the valve segment 19 next to the end plate 20. However, said description is likewise valid for the other two valve segments 19. The valve segment 19 comprises a control valve 2 which is connected on its input side with the channel 41, the user port A1 and the user port B1, respectively. The control valve 2 can assume three positions, the center or blocking position as shown and two control positions for connecting the pump 17 either with user A1 or with user B1, while at the same time the respective other port is connected to the tank line 241. The lines or channels leading from the input side of the control valve 2 to the user ports A1 and B1, respectively, are referred to as 9A and 9B, respectively. The pressure medium paths in the control valve 2 are referred to by 33 and 34, and reference numeral 32 refers to an orifice which is provided in a third pressure medium path.

The output side of the control valve 2 is connected via a line 140 to a throttle valve 3, which is biased by a positioning spring 6 into its closed position. The throttle valve is controlled and can be called a pressure differential control valve. A line 22 leads from a second outlet port of the control valve 2 to the output side 108B of the throttle valve 3, further to a first input of a shuttle valve 4 and also to a first input 104 of another shuttle valve 5. The first shuttle valve 4 has another input 402 connected to channel 9, and its output 403 is connected to the throttle valve 3.

The second shuttle valve 5 has a second input 106 connected to the tank channel 241 and an output 107 connected to an input 106 of the shuttle valve 5 of the next adjacent valve segment 19. The third output port of the control valve 2 is connected via a line 209 to the tank channel 241.

Referring now to the next adjacent valve segment 19 is noted that the output 107 of the shuttle valve 5 is connected to the input 106 of the shuttle valve 5 of the valve segment 19 adjacent to the input segment 18. The output 107 of the shuttle valve 5 of said valve segment 19 is connected via a control pressure line 23 to the pressure reducing valve 15 which was already mentioned above.

An input 15*a* of the pressure reducing valve 15 is connected via a channel 40 to the pump channel 41. Also, a control line 150 connects the pressure reducing valve 15 with the channel LS and a control line 151 connects the pressure reducing valve 15 with the tank channel 241.

FIG. 2 and 3 disclose a preferred embodiment of a control valve 2 together with the throttle valve 3 which acts as a pressure compensator or pressure balance means as was described earlier. It may be added that in FIG. 2 the control spool 7 has a built-in shuttle valve 4. The other shuttle valve 5 is not shown in FIG. 2, only the channel (referred to by 5) leading to it. Turning again to the shuttle valve 4 it can be noted that one of its inputs is connected to a channel referred to as LS. The other input is connected to channel 8*b*. The output is in connection with the control chamber 10. In it position shown in FIG. 2 the control spool of the throttle valve 3 is in its closed position, in which an upper extension 380 is in abutment with an edge of the valve housing due to the force excerted by spring 6. Nct only extension 380, also spring guide rod 381 are fixedly mounted to (or integral with) the control spool 7.

An essential aspect of the invention is the presence of the pressure reducing valve between control line 23 and channel 9 (LS). Without the presence of the pressure reducing valve 15 the load pressure coming on control pressure line 23 would have to act like a pump, i.e., would have to supply energy to channel 9 so as to actuate respective ceck valve 4 and particularly throttle valve 3. Due to the presence of the pressure reducing valve 15 only a pressure signal on line 23 is required. The energy for supplying channel 9 and its valves is taken from the pump 17. It should be remembered that without pressure reducing valve 15 the valve 3 will have to be moved by energy coming from the load. Thus, initially a sinking of the load will occur and only thereafter the actual control will start. The invention provides for the transformation of the pressure signal on line 23 into a flow signal on line 150 which will cause the movement of the spool 7 with fluid coming from the pump and not from the user.

For a load independent control of a plurality of simultaneously actuatable hydraulic users, a throttle valve (pressure compensator) is assigned to the control valve of each user at a location downstream with respect to the metering orifice formed by said control valves; said throttle valve is subjected in opening direction to the pump pressure and in closing direction to a pressure which is determined by the highest load pressure occurring for one of said users. Said highest load pressure which is reported by a shuttle valve chain is supplied as control pressure to a pressure reducing valve, the inputs side thereof being connected with the pressure line of the pump and the output side thereof being connected to control lines leading to the throttle valves assigned to the individual control valves and to the control line for the pump control.

The control of the pump control as well as of the pressure compensators by means of the highest indirect load pressure LS to the pressure reducing valve has the advantage that for starting and changing of direction, respectively, the danger of a sinking of the user is avoided.

We claim:

1. A load independent valve control for a plurality of hydraulic users which can be simultaneously controlled, wherein the following is assigned to each user:

a control valve (2) and a pressure compensating throttle valve, located and the respective user, which is subjected in an opening direction to a pressure (P) of a pump (17) and in a closing direction to a pressure defined by a highest load pressure of the users, characterized in that the highest load pressure controls via a shuttle valve chain a pressure reducing valve (15), an input side of which is selectively connected to the pump (17) or to tank and an output side of which is connected to control conduits (LS) which lead to the throttle valves (3) and a pump control (16), the throttle valve (3) being subjected in the closing direction via a shuttle valve (4) either to pressure defined by the pressure reducing valve (15) or to a load pressure existing at the respective user (A1,B1).

2. Load independent valve control as set forth in claim 1, characterized in that in a center position of the control valves (2), the control line (9) is relieved towards tank by the pressure reducing valve (15).

3. Load independent valve control of claim 1 having a pump control, characterized in that the pressure determined by the pressure reducing valve (15) is at the same time the control pressure for the pump control (16).

4. Load independent valve control as set forth in claim 1, wherein the control valve assigned to each user comprises a spool section for directional control and a spool section for speed control of the respective user, and wherein the throttle valve (3) is provided between the spool section of the spool for speed control of the user and the spool section separate therefrom for directional control, said throttle valve (3) being arranged in a housing channel extending transversely with respect to an axis for the control valve spool, and the spool of said throttle valve (3) closing the flow cross section via said channel, characterized in that the spool section for speed control is between housing chambers (11*a*, 11*b*) subjected to pump pressure, said housing chambers being combined to a common input and output flow channel (P,P') and are located on either side of a second housing chamber, said second housing chamber (26) being connected with the channel (14) in which the throttle valve (93) is arranged, and wherein said second housing chamber of said housing chambers (11*a*, 11*b*) subjected to pump pressure, control edges (13*a*,13*b*) which cooperate with respective control edges (12*a*, 12*b*) of a control spool section (21*a*).

5. Load independent valve control as set forth in claim 1, characterized in that the spool (7) of the throttle valve (3) is the shuttle valve (4) which is subjected on one side to the load pressure of the suer by the respective control valve (2) and on the other side, to the highest load pressure in the system, and wherein an output (25) of the shuttle valve (4) is connected to a control chamber (10) of the throttle valve which is subjected to the control pressure.

6. A load independent valve control for a plurality of users comprising:

a pump means adapted to supply a pressurized fluid, a plurality of users adapted to be supplied by a pressurized medium from said pump, control valve means (2) between said pump means and said users, each of said users showing a certain load pressure, control means arranged between said control valve means and said load so as to control fluid flow to said users, means for supplying a pressure defined by a highest load pressure to said control means and control supply means (15) adapted to receive a pressure signal representing the highest load signal pressure and adapted to supply a corresponding fluid flow signal based on fluid received from said pump means to said control means, said control means comprising in a flow direction upwardly between the control valve means and the user, a throttle valve (3), said throttle valve being subjected in a closing direction via a shuttle valve (4) either to a pressure defined by the control supply means (15) or to load pressure existing at the respective user.

7. The control of claim 6, wherein said pressurized fluid is hydraulic oil.

8. The control of claim 6, wherein said control supply means is a pressure reducing valve.

9. The control of claim 8, wherein the highest load pressure is adapted to control via a shuttle valve chain (4) the pressure reducing valve (15), the input side of which is connected to said pump means (17) and the output side of which is connected to control conduits (LS) leading to the throttle valves (3) and the pump control (16).

10. The control of claim 9, wherein said output side is selectively to the throttle valves (3) and the pump control (16) or to tank (T).

* * * * *